(12) United States Patent
Luise et al.

(10) Patent No.: US 9,509,189 B2
(45) Date of Patent: Nov. 29, 2016

(54) MAGNETIC WEDGE

(75) Inventors: Fabio Luise, Zelarino (IT); Antonio Calonico, Vittorio Veneto (IT)

(73) Assignee: Nidec ASI S.p.A., Milan (IT)

( * ) Notice: Subject to any disclaimer, the term of this patent is extended or adjusted under 35 U.S.C. 154(b) by 94 days.

(21) Appl. No.: 14/008,896

(22) PCT Filed: Mar. 28, 2012

(86) PCT No.: PCT/IB2012/051488
§ 371 (c)(1),
(2), (4) Date: Sep. 30, 2013

(87) PCT Pub. No.: WO2012/131596
PCT Pub. Date: Oct. 4, 2012

(65) Prior Publication Data
US 2014/0028145 A1    Jan. 30, 2014

(30) Foreign Application Priority Data

Mar. 31, 2011  (IT) ................ MI2011A0539

(51) Int. Cl.
*H02K 3/493*  (2006.01)
(52) U.S. Cl.
CPC .................... *H02K 3/493* (2013.01)
(58) Field of Classification Search
CPC .............. H02K 3/487; H02K 3/493
USPC .................. 310/214, 215, 156.18
IPC ..................................... H02K 3/493
See application file for complete search history.

(56) References Cited

U.S. PATENT DOCUMENTS

| | | | | |
|---|---|---|---|---|
| 4,293,787 A | * | 10/1981 | Ito et al. ............ | 310/181 |
| 4,425,521 A | | 1/1984 | Rosenberry, Jr. et al. | |
| 2001/0030475 A1 | * | 10/2001 | Kliman et al. ........ | 310/89 |
| 2009/0045692 A1 | | 2/2009 | Rozier et al. | |

FOREIGN PATENT DOCUMENTS

| | | | | |
|---|---|---|---|---|
| CH | 410 147 A | | 3/1966 | |
| GB | 114638 A | * | 4/1918 | ........ H02K 3/493 |
| GB | 1100499 A | * | 1/1968 | ........ H02K 3/493 |
| JP | 54 042911 U | | 3/1979 | |
| JP | 54 113002 U | | 8/1979 | |
| JP | 59 136040 A | | 8/1984 | |
| SU | 1 274 075 A1 | | 11/1986 | |
| SU | 1274075 | * | 11/1986 | ........ H02K 3/493 |

OTHER PUBLICATIONS

USPTO Partial Translation, Takeshima, JP 54-113002, Aug. 1979.*
USPTO Translation, Takeshima, S54-113002, Jul. 2015.*

* cited by examiner

*Primary Examiner* — Thomas Truong
(74) *Attorney, Agent, or Firm* — Alan G. Towner, Esq.; Pietragallo Gordon Alfano Bosick & Raspanti, LLP

(57) ABSTRACT

A magnetic wedge comprises a first element of magnetic material extending longitudinally along a first direction and second element of non-magnetic material coupled to the first element and having at least one skew portion relative to the longitudinal extension direction of the wedge.

10 Claims, 10 Drawing Sheets

MAGNETIC WEDGE

FIELD OF THE INVENTION

The present invention relates to a magnetic wedge for slots of an electrical rotating machine.

BACKGROUND OF THE INVENTION

In electrical rotating machines, electrical windings are often retained by means of wedges within slots formed in the stator or in the rotor.

The slot closing wedges may be non-magnetic or magnetic.

Magnetic wedges are obtained, for example, with dispersions of iron oxide in epoxy resin or with the sintering of ferromagnetic materials, such as iron oxides or other magnetic particles, in a binder, for example organic.

The advantages resulting from the use of magnetic wedges (that is, having a high magnetic permeability) in terms of limitation of additional leaks and dispersed flows have long been known.

The performance of an electrical motor, in particular of a permanent magnet motor, is also characterised by the extent of the harmful parameters, cogging and ripple torque.

Cogging torque is caused by the tendency of the rotor to align with the stator in the direction of maximisation of the magnetic circuit permeance whereas the ripple torque basically results from the interaction of the rotor flow with the spatial magnetic field (due to the stator winding distribution) and temporal (that is, resulting from the current waveform associated to the power converter) harmonics.

In order to reduce the cogging torque, it is known to use rotor or stator slot magnets with a slight skew relative to the direction of the rotation axis of the electrical machine. Such solution, however, may only be applied to one-piece electrical motors and not to modular electrical motors as well.

The advantages of multi-sector, that is, modular electrical machines, are known, wherein the stator is divided into separate sectors, equal to each other, and the rotor is divided into poles or polar groups separated from each other. Such electrical machines are particularly suitable for large slow windpower and submarine applications and minimise the manufacturing and maintenance costs, managing the easier-to-handle elementary components in series, and they limit any machine downtimes due to electrical failures.

It would be desirable to keep, also on modular electrical machines, the positive skew effect on the cogging and ripple torques as is possible in one-piece machines. However, as said above, the slot skewing technique is actually applicable only to one-piece machines and not also to multi-sector machines.

A further problem related to the use of magnetic wedges is represented by the leakage reactance which, especially in permanent magnet motors with wound tooth stator, is already intrinsically high and implies a low power factor. For these types of motors, the use of non-magnetic wedges is widespread, but however they cause the impossibility of having the benefits on ripple and cogging torque due to the magnetic wedge.

SUMMARY OF THE INVENTION

The object of the present invention is to provide a magnetic wedge having such functional and structural features as to meet the above needs while solving the disadvantages mentioned above with reference to the prior art.

Such object is achieved by a magnetic wedge according to claim 1.

BRIEF DESCRIPTION OF THE DRAWINGS

Further features and advantages of the wedge according to the present invention will appear more clearly from the following description of a preferred embodiment thereof, given by way of a non-limiting example with reference to the annexed figures, wherein.

DETAILED DESCRIPTION

Figure 1:
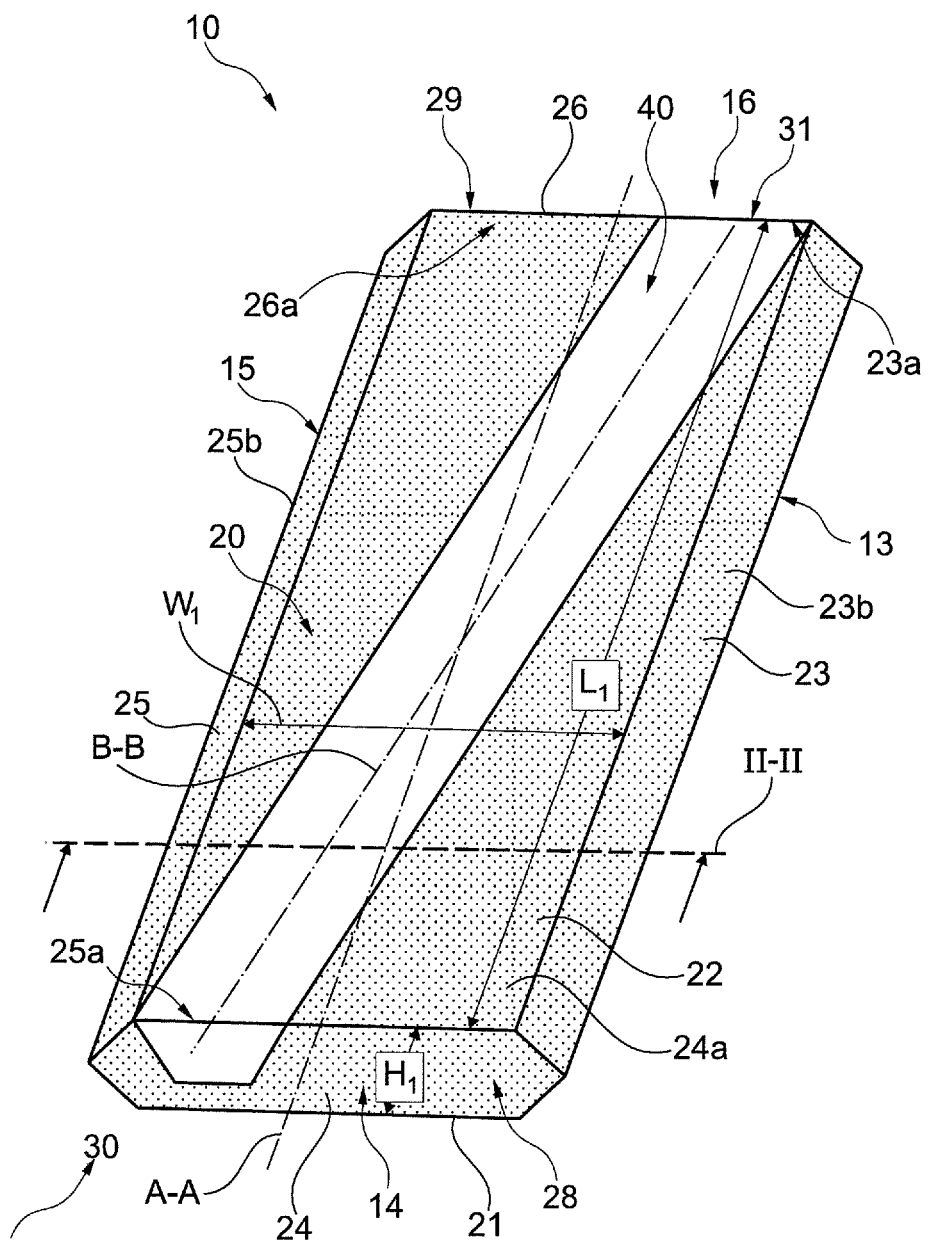
FIG. 1 shows a schematic perspective view of a wedge according to a first embodiment of the present invention.

With reference to the above annexed figures, reference numeral 10 globally indicates a magnetic wedge according to the present invention.

In particular, wedge 10 is intended for closing the slots of an electrical rotating machine 1.

The electrical rotating machine 1 comprises a rotor 2, adapted to rotate about an axis of rotation X-X and a stator 3. An air gap 6 is formed between rotor 2 and stator 3.

In the example, stator 3 comprises a plurality of slots 4 for seating stator windings 5 whereas rotor 2 is provided with permanent magnets 7.

Wedge 10 is intended for closing the stator slots 4 of the electrical machine 1. It should be noted that in addition to electrical machines with permanent magnets, wedge 10 may also be intended for closing the rotor slots of a machine, for example synchronous, with wound rotor or synchronous and having both with radial flow (both with rotor inside and rotor outside the stator) or axial flow configurations.

Wedge 10 extends longitudinally by a first length L1, between two ends 14, 16, along a first direction A-A that, when wedge 10 is placed to close a slot 4, is parallel to the axis of rotation X-X of the electrical rotating machine 1, and extends crosswise to the first direction A-A between two side edges 13, 15.

Wedge 10 has height H1, width W1 and length L1 commensurate to the dimensions of slot 4 wherein the same wedge 10 must be inserted.

Wedge 10 further exhibits a first surface 11 intended to face slots 4 of the electrical rotating machine 1, when wedge 10 is placed to close slots 4, and an opposite second surface 12 intended to face air gap 6 of the electrical rotating machine 1, when wedge 10 is placed to close slots 4.

Wedge 10 comprises a first portion 20 of magnetic material and a second portion 40, on non-magnetic material, coupled to the first portion 20.

The second portion 40 comprises at least one skew portion longitudinally extended along a second direction B-B which is skew relative to the first direction A-A, by a second length L2 equal to at least 70% of distance D between the two ends 14, 16 of wedge 10, measured along the second direction B-B.

Thanks to the fact that wedge 10 has at least one non-magnetic portion which extends skew-wise relative to direction A-A and thus skew-wise relative to the axis of rotation X-X of the electrical machine 1, wedge 10 reproduces the positive effects of the skew on the cogging and ripple torques while retaining the general advantages of a magnetic wedge.

Simulations made by comparing wedge 10 with a magnetic wedge without skew non-magnetic portions have shown an even doubled efficacy of wedge 10 in limiting the undesired components of the ripple and cogging torque.

Simulations have also been made for assessing the impact of any separations (2 mm) that interrupt the magnetic continuity of both the yoke and the teeth on a closed stator in the presence and absence of wedge 10. Also in this case, wedge 10 has shown an excellent behaviour both in terms of cogging torque and of ripple torque.

In addition to the beneficial effects similar to the stator skewing effect, wedge 10 allows the leakage reactance associated with the slot to be accurately controlled. In particular, managing the geometry and the physical properties of the wedge in the design stage it is possible to obtain such a leakage reactance value as to make the electrical machine that uses it "fault tolerant".

Within the scope of the present invention, the term "fault tolerant" indicates an electrical machine with modular sectors provided with wedge 10 according to the present invention, wherein the electrical machine has a short-circuit current lower than or equal to, the nominal operating current. This feature, in the convenient concurrent adoption of multiple power converters connected to a suitable number (and distribution) of the sectors of the same electrical machine allows the electrical machine to continue operating at reduced power also in the event of a short-circuit in one (or more) of the machine sectors, without necessarily being forced to stop the electrical drive. In the practice, the possible breakdown of the insulation between coils or against ground causes the circulation of a permanent component for the fault current which is limited or lower than the nominal current amplitude. This special feature makes the same fault current thermally bearable or even limitless.

Assuming that the electronic converter automatically intervenes to self-protect during the development of the transient over currents associated with the failure (as it normally happens), the faulty electrical machine provided with wedge 10 can therefore continue its operation converting a fraction (even significant) of the nominal power through the remaining working sectors and the relevant converters.

According to one embodiment, one of the first 20 and the second 40 portion extends between the two side edges 13, 15 seamlessly. In this way, wedge 10 has a greater mechanical strength and may be industrially made with more efficient and economically convenient manufacturing methods.

According to said embodiment, the first 20 and the second 40 portion are shaped so that at least one horizontal plane extending between the two side edges 13, 15 crosses only one of the first 20 and the second 40 portion.

In other words, the first 20 and the second 40 portion are shaped so that at least one vertical plane extending between the first 11 and the second 12 surface crosses both the first 20 and the second 40 portion.

Advantageously, said horizontal plane is defined by at least one of the two surfaces 11, 12.

According to one embodiment, the second length L2 is equal to at least 95% of distance D between the two ends 14, 16, measured along the second direction B-B.

Advantageously, the second length L2 is substantially equal to distance D between the two ends 14, 16, measured along the second direction B-B.

According to one embodiment, the first magnetic portion 20 comprises iron oxides, for example a fibreglass matrix which supports a dispersion of iron oxides in resin, or particles of agglomerated or sintered ferromagnetic materials.

According to one embodiment, the second non-magnetic portion 40 comprises epoxy resin, vetronite, polymer-based compounds, ceramic or any non-magnetic electrical insulating or low electrical conductivity structure.

Figure 2:
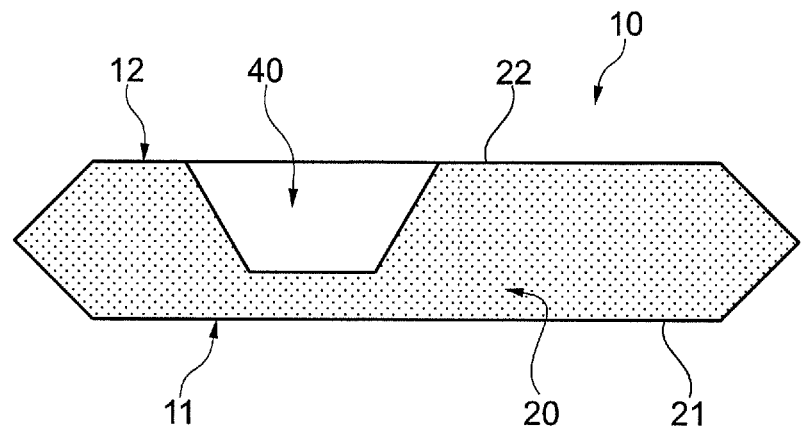
FIG. 2 shows a cutaway view of the wedge of FIG. 1, along the section line II-II of FIG. 1.
Figure 3:
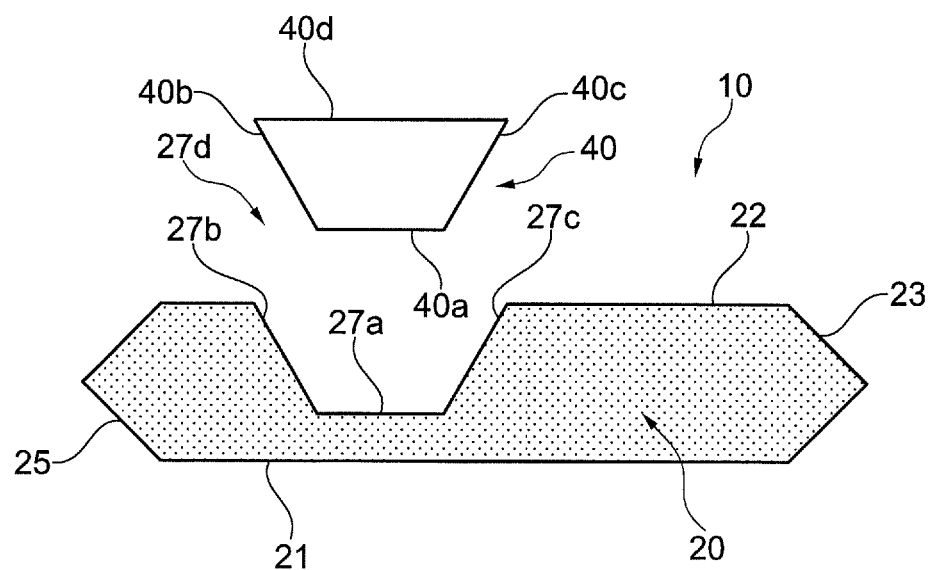
FIG. 3 shows an exploded view of the section of FIG. 2.

With reference to FIGS. 1 to 3, a wedge 10 according to a first embodiment is shown. According to such embodiment, the first portion 20 comprises a first magnetic element 20 having a first surface 21 intended to face slots 4 of the electrical rotating machine 1, when wedge 1 is placed to close slots 4, and an opposite second surface 22 intended to face air gap 6 of the electrical rotating machine 1, when wedge 1 is placed to close slots 4.

The second portion 40 is defined by a second non-magnetic element having length L2.

In the example, the magnetic element 20 has a parallelepiped shape with two opposite base walls 21, 22 which form two opposite surfaces 21, 22 and which extend between the two ends 14, 16, and four side walls 23, 24, 25, 26, which form four corresponding edges 23a, 24a, 25a, 26a.

The four side walls 23-26 comprise two long side walls 23, 25 extending along the first direction A-A, between the two ends 14, 16 and defining the two side edges 13, 15, and two short side walls 24, 26 extending perpendicular to the first direction A-A, between the two side edges 13, 15. In order to lock wedge 10 to slot 4, the long side walls 23, 25 are shaped so as to have locking surfaces 23b, 25b adapted to couple with locking seats 8 formed in slot 4.

For example, the locking surfaces 23b, 25b may be shaped as a trapezium or may be rounded.

The magnetic element 20 has a groove 27 formed in one of the two surfaces 21, 22.

In the example shown in the attached figures, groove 27 is formed in surface 22 facing air gap 6. Alternatively, groove 27 may be formed in surface 21 facing slot 4.

Groove 27 extends along the second direction B-B by the same length L2 of the second non-magnetic element 40 which is seated within said groove 27.

Groove 27 exhibits a bottom 27a, side walls 27b and 27c and an opening 27d facing air gap 6.

In the example shown in the figures, groove 27 has a trapezoidal section with shorter base 27a which identifies the bottom of groove 27 and oblique sides 27b and 27c which identify the side walls while the longer base 27d identifies the opening of groove 27 on surface 22.

With reference to the figures, groove 27 extends along the second direction B-B between two opposite ends 30, 31 which in the example correspond to the opposite ends 14, 16 of wedge 10.

In particular, the non-magnetic element 40 is positioned within groove 27 and extends along the second direction B-B by the entire extension of groove 27 between the two opposite ends 28, 29.

The non-magnetic element 40 is therefore integrally coupled with groove 27 of the magnetic element 20.

According to one embodiment, groove 27 extends diagonally between two edges arranged on opposite side walls, for example the two edges 23a, 25a or the two edges 24a, 26a. This allows the skew effect of wedge 10 to be optimised.

In the example shown in the figures, the non-magnetic element 40 has a trapezoidal section with shorter base 40a which couples with the bottom of groove 27 and oblique sides 40b and 40c which couple with the side walls whereas the longer base 40d faces air gap 6.

Wedge 10 may be made with different methods. By way of an example, groove 27 may be made by mechanical processing of the magnetic element 20, for example by milling, and the non-magnetic element 40 may be positioned within groove 27 by a casting process with epoxy resin into groove 27 up to the complete filling of the same and subsequent polymerisation of the epoxy cast with forming and complete adhesion of the non-magnetic element 40. Alternatively, elements 20, 40 may be coupled by gluing.

It should be noted that each slot 4 may be closed by a plurality of wedges 10, arranged in a sequence axially aligned along the respective first direction A-A and in contact with each other in respective end contact portions, identified by ends 28, 29, so as to form a modular wedge 50.

Figure 4:
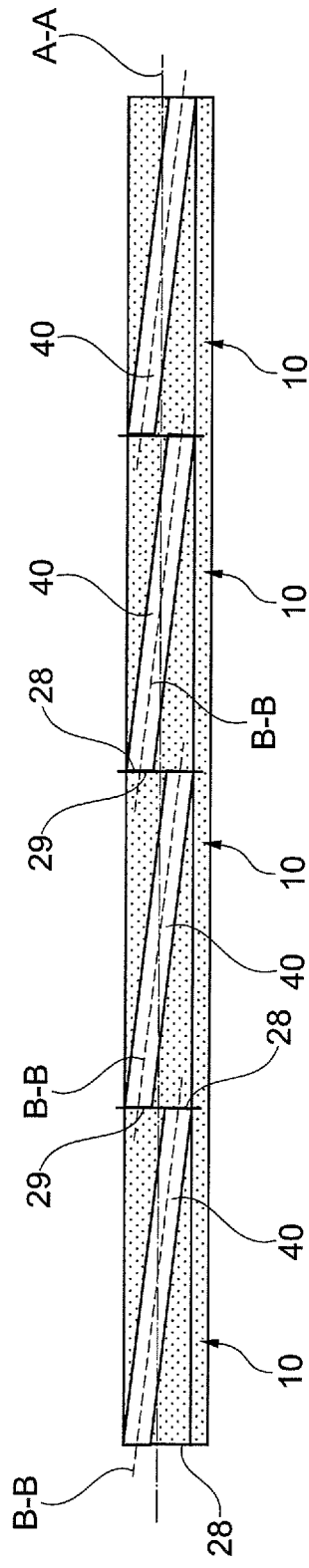
FIG. 4 shows a schematic perspective view of a modular wedge according to a first embodiment of the present invention.

In the embodiment of FIG. 4, two consecutive wedges 10 exhibit the respective skew non-magnetic portions extending along the respective second directions B-B so that the same second directions B-B are parallel to each other.

Figure 5:
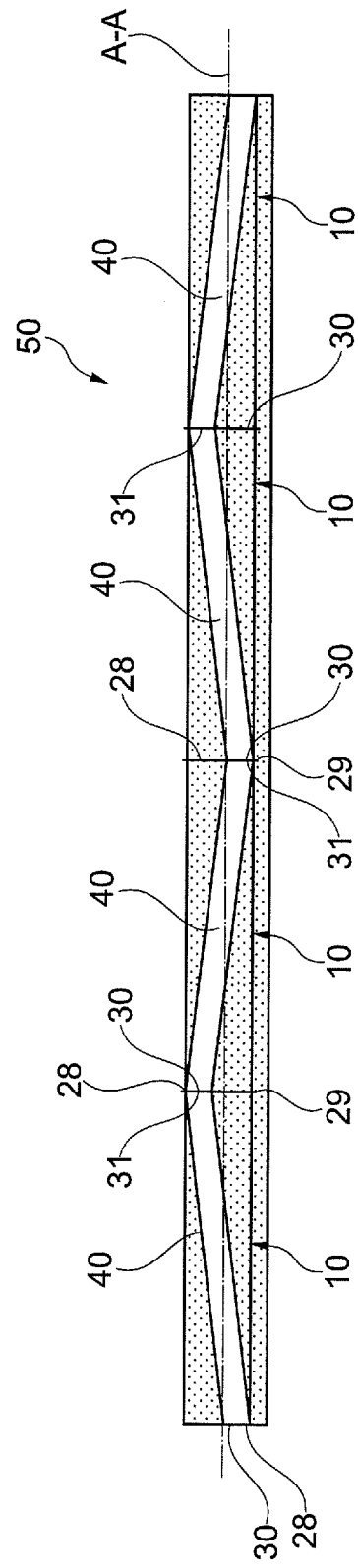
FIG. 5 shows a schematic perspective view of a modular wedge according to a second embodiment of the present invention.
Figure 6:
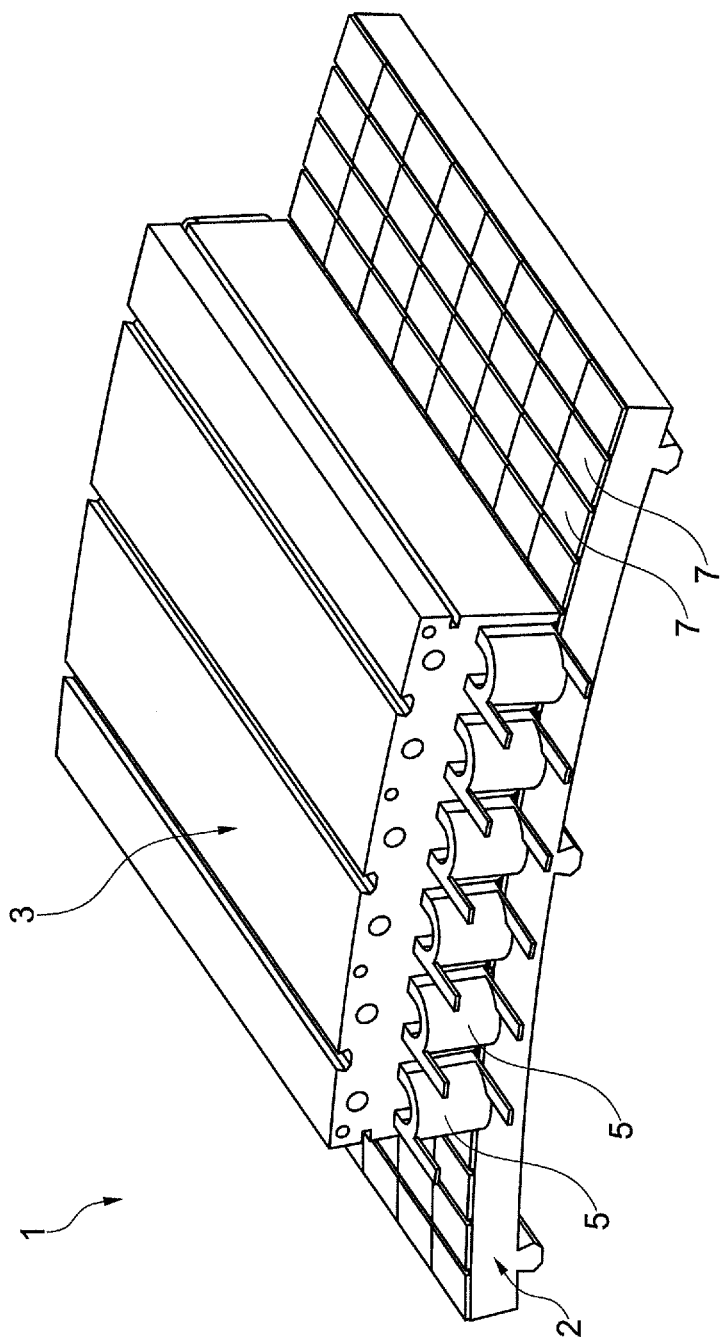
FIGS. 6 to 8 show different schematic perspective views of an electrical motor with a wedge according to the present invention.
Figure 7:
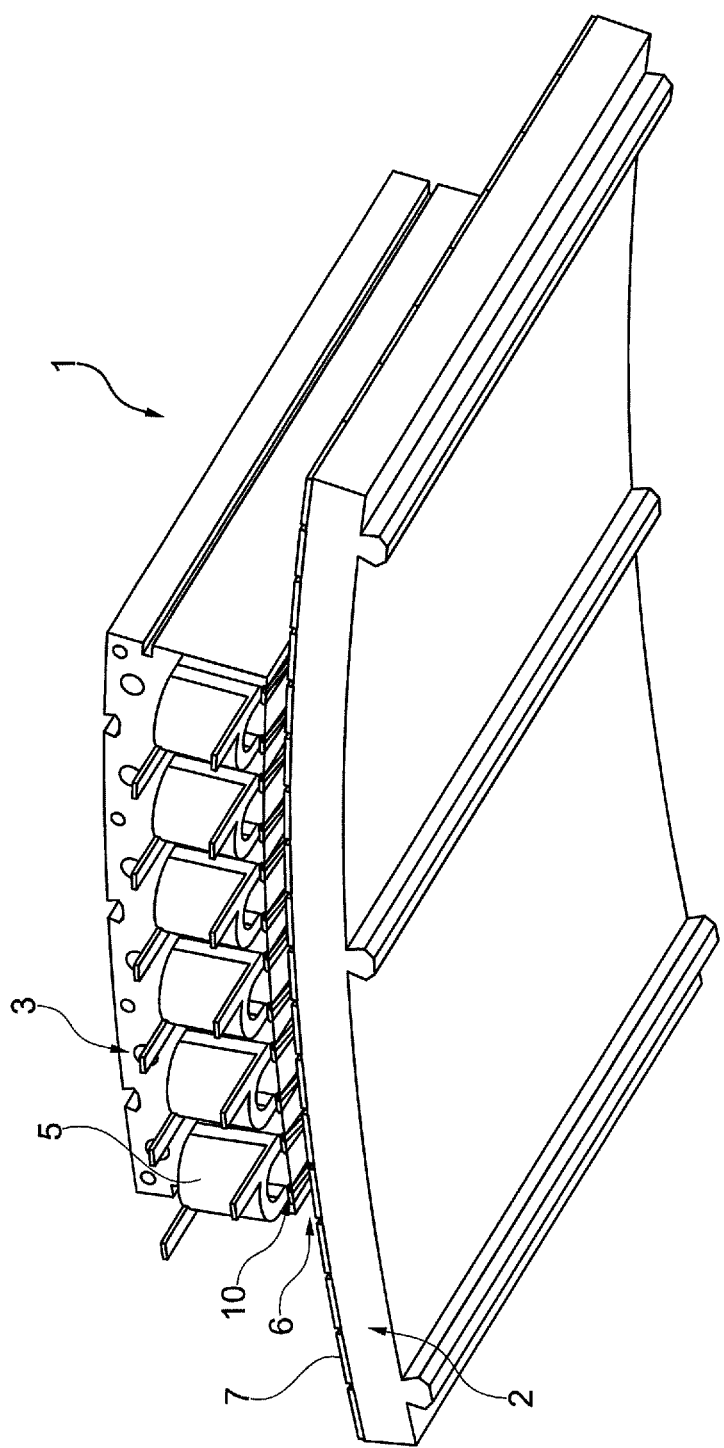
Figure 8:
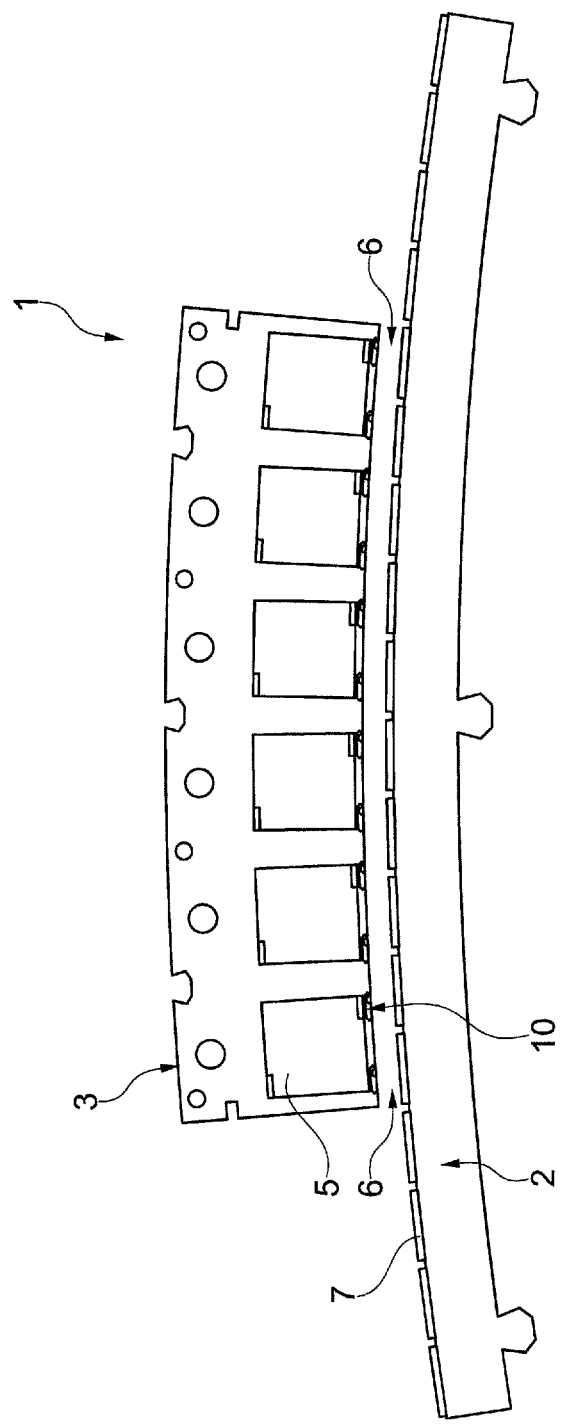
Figure 9:
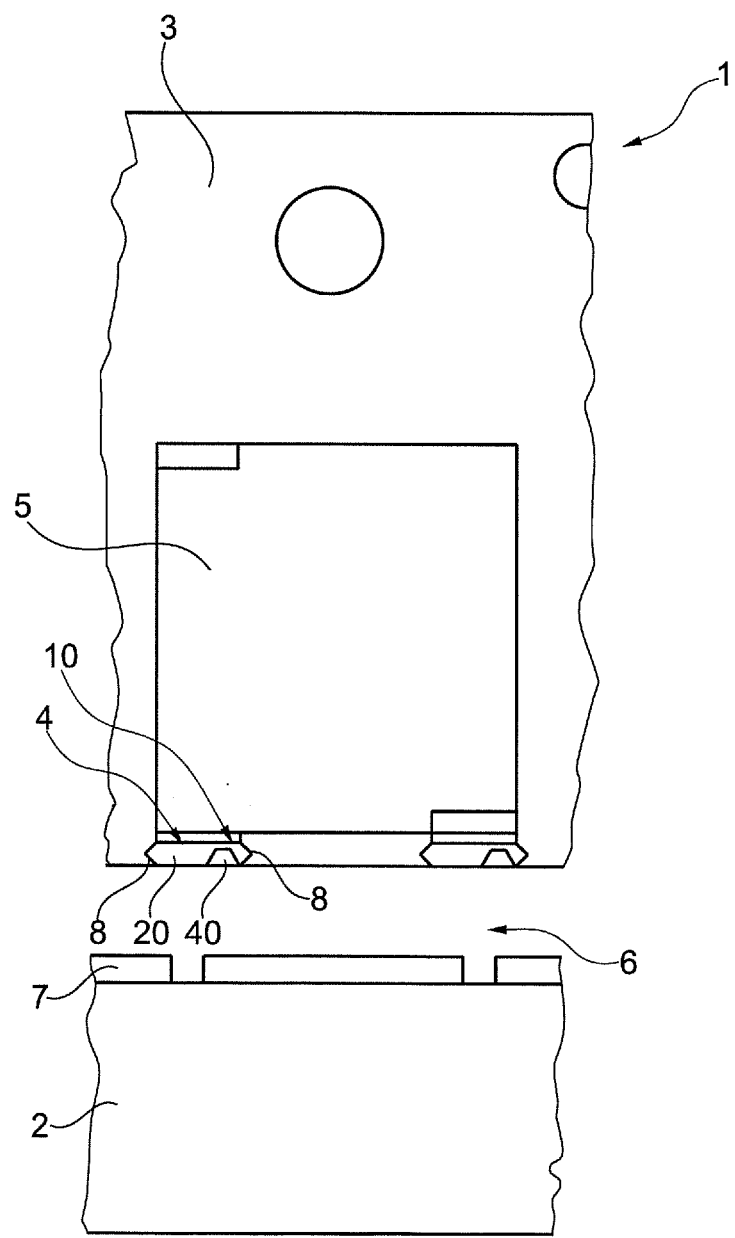
FIG. 9 shows a detail of the electrical motor of FIG. 6.
Figure 10:
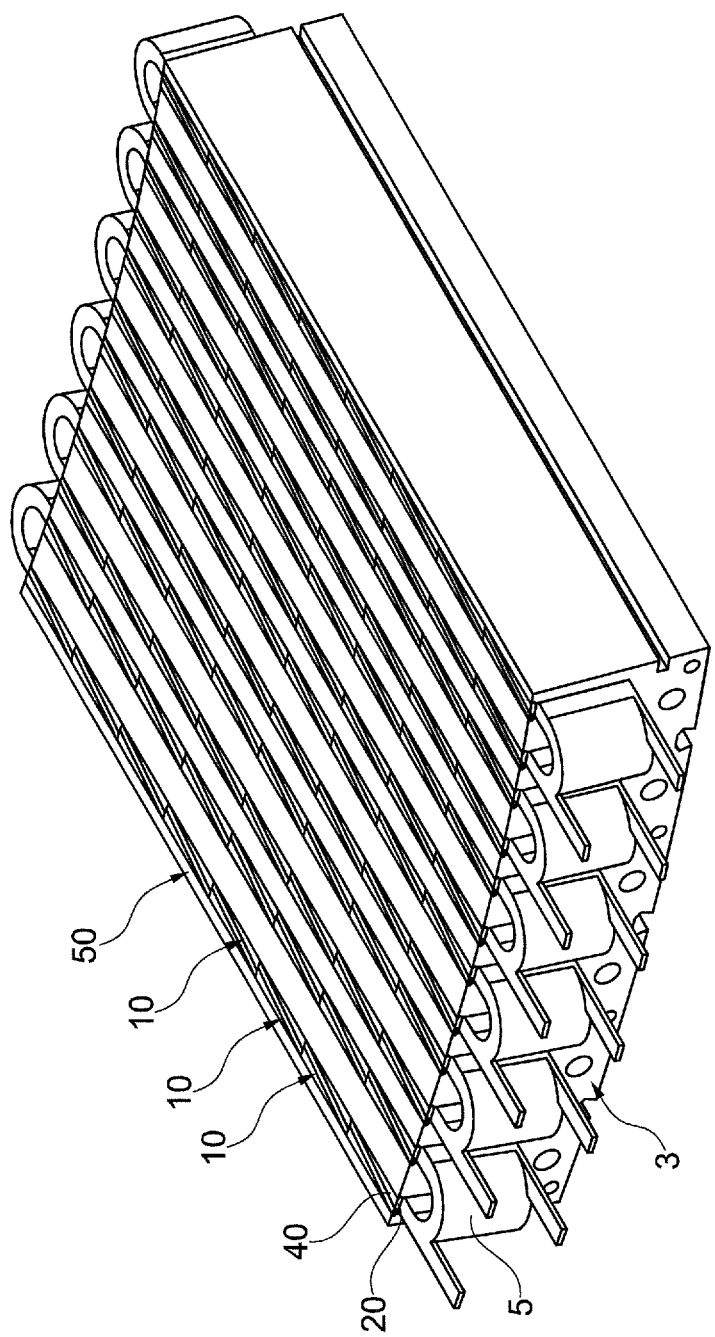
FIG. 10 shows a schematic perspective view of the electrical motor of FIG. 6 without the rotor.

In the embodiment of FIG. 5, two consecutive wedges 10 exhibit the respective skew non-magnetic portions extending along the respective second directions B-B so that said non-magnetic portions are in contact with each other in the opposite ends 30, 31.

Figure 11:
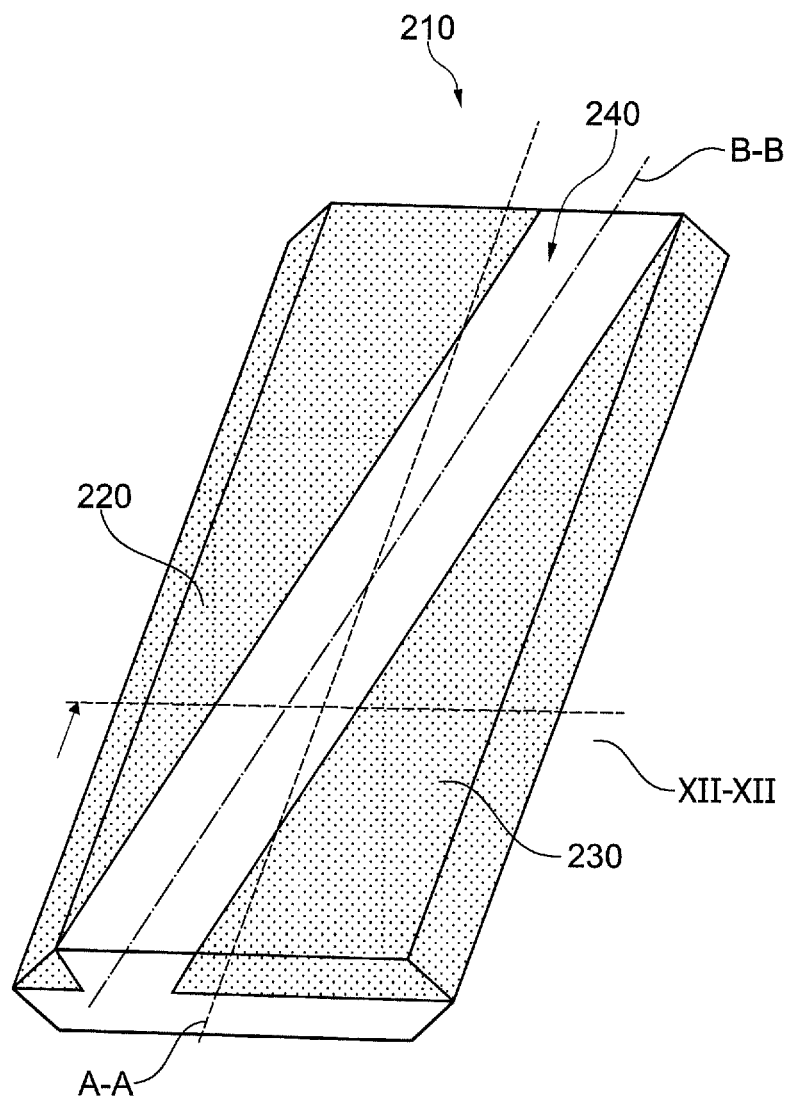
FIG. 11 shows a schematic perspective view of a wedge according to a second embodiment of the present invention.
Figure 12:
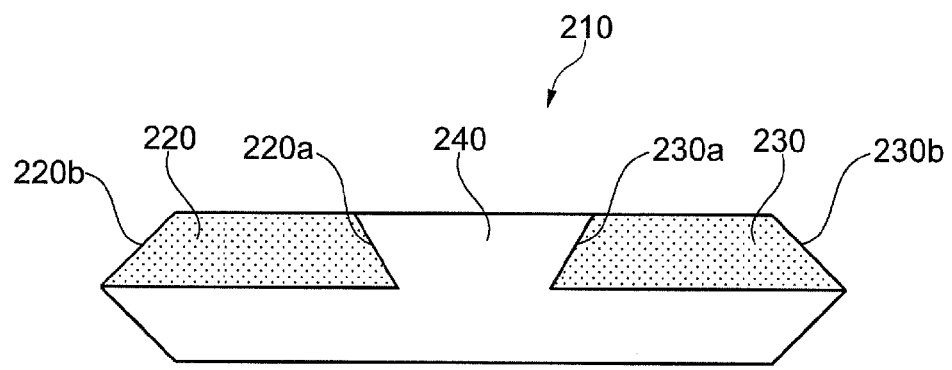
FIG. 12 shows a cutaway view of the wedge of FIG. 11, along the section line XII-XII of FIG. 11.
Figure 13:
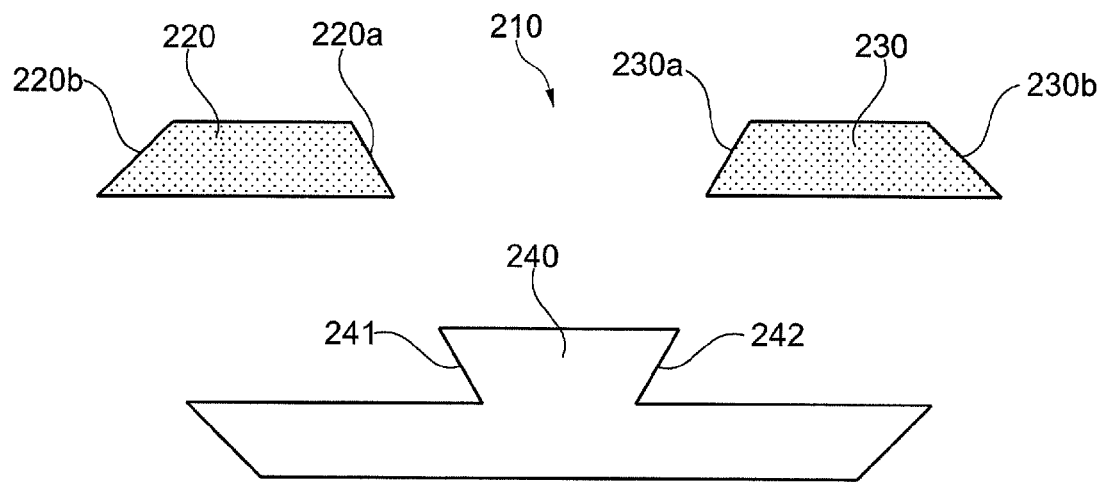
FIG. 13 shows an exploded view of the section of FIG. 12.

With reference to FIGS. 11 to 13, a wedge 210 according to a second embodiment is shown. The first magnetic portion 20 comprises two elements of magnetic material 220, 230 having each a side mating surface 220a, 230a.

The side mating surfaces 220a, 230a are arranged opposite to the respective locking surfaces 220b, 230b adapted to couple with the locking seats 7 formed in slot 4.

The second non-magnetic portion 40 comprises an element of non-magnetic material 240 having two opposite side mating surfaces 241, 242, each arranged facing and in contact with a respective side mating surface 220a, 230a of a magnetic element 220, 230. In the example, the side mating surface 241 of the non-magnetic element 240 faces and is in contact with the side surface 220a of the magnetic element 220 whereas the side mating surface 242 of the non-magnetic element 240 faces and is in contact with the side surface 230a of the magnetic element 230.

Wedge 210 may be made with different methods. By way of an example, the magnetic elements 220 and 230 may be coupled with the non-magnetic element 240 by gluing or arranging the two magnetic elements in a special mould with subsequent casting of epoxy resin and polymerisation of the epoxy cast with forming and complete adhesion of the non-magnetic element 240 to the magnetic elements 220 and 230.

As it may be understood from the description, the magnetic wedge according to the present invention allows meeting the needs and overcoming the drawbacks mentioned in the introductory part of the present description with reference to the prior art.

Of course, a man skilled in the art may make several changes and variations to the wedge according to the invention described above in order to meet specific and incidental needs, all falling within the scope of protection defined in the following claims.

The invention claimed is:

1. Magnetic wedge for closing slots of an electrical rotating machine, said magnetic wedge extending longitudinally by a first length, between two ends, along a first direction parallel to the axis of rotation of the electrical rotating machine and extending crosswise to the first direction between two side edges, said magnetic wedge comprising:

a first portion of magnetic material;

a second portion of non-magnetic material coupled to said first portion, wherein said wedge has a first surface intended to face the slots of the electrical rotating machine, when said wedge is placed to close the slots, and an opposite second surface intended to face the air gap of the electrical rotating machine, when said wedge is placed to close the slots, said second portion comprises at least one skew portion longitudinally extended along a second direction which is skew relative to the first direction, by a second length equal to at least 70% of the distance between said two ends, measured along the second direction, said first portion comprises a single piece extending seamlessly along the first direction by the first length between said two ends, and extending crosswise to the first direction between said two side edges, said first portion comprises a first surface intended to face the slots of the electrical rotating machine when said wedge is placed to close the slots, and an opposite second surface intended to face the air gap of the electrical rotating machine when said wedge is placed to close the slots, said first portion has a groove formed in one of said first and second surface of the first portion and extending longitudinally along said second direction, said groove exhibits a bottom and two side walls and an opening facing the slots or the air gap, and said at least one skew portion of the second portion is positioned within said groove by the entire longitudinal extension of the groove.

2. Magnetic wedge according to claim 1, wherein said first and second portion are shaped so that at least one horizontal plane extending between said two side edges crosses only one of said first and second portion.

3. Magnetic wedge according to claim 2, wherein said at least one horizontal plane is defined by at least one of said first and second surface.

4. Magnetic wedge according to claim 1, wherein said first and second portion are shaped so that at least one vertical plane extending between said first and second surface crosses both said first and second portion.

5. Magnetic wedge according to claim 1, wherein said second length is equal to at least 95% of the distance between said two ends, measured along said second direction.

6. Magnetic wedge according to claim 1, wherein said second length substantially corresponds to the distance between said two ends, measured along said second direction.

7. Magnetic wedge according to claim 1, wherein said first element has a parallelepiped shape with two opposite base walls which form said two opposite surfaces and four side walls, which form four corresponding edges.

8. Magnetic wedge according to claim 1, wherein said groove extends diagonally between two edges of opposite side walls.

9. Magnetic wedge according to claim 1, wherein said first magnetic portion comprises iron oxides and said second non-magnetic portion comprises epoxy resin.

10. Electrical rotating machine having an axis of rotation and a plurality of slots for seating stator or rotor windings, each slot extending along a direction parallel to the direction of said axis of rotation and being closed by a respective magnetic wedge, each magnetic wedge extending longitudinally by a first length, between two ends, along a first direction parallel to the axis of rotation of the electrical rotating machine and extending crosswise to the first direction between two side edges, said magnetic wedge comprising a first portion of magnetic material, a second portion of non-magnetic material coupled to said first portion, wherein said wedge has a first surface intended to face the slots of the electrical rotating machine, when said wedge is placed to close the slots, and an opposite second surface intended to face the air gap of the electrical rotating machine, when said wedge is placed to close the slots, said second portion comprises at least one skew portion longitudinally extended along a second direction which is skew relative to the first direction, by a second length equal to at least 70% of the distance between said two ends, measured along the second direction, wherein said first portion comprises a single piece extending seamlessly along the first direction by the first length between said two ends, and extending crosswise to the first direction between said two side edges, said first portion comprises a first surface intended to face the slots of the electrical rotating machine, when said wedge is placed to close the slots, and an opposite second surface intended to face the air gap of the electrical rotating machine, when said wedge is placed to close the slots, said first portion has a groove formed in one of said first and second surface of the first portion and extending longitudinally along said second direction, said groove exhibits a bottom and two side walls and an opening facing the slots or the air gap, said at least one skew portion of the second portion is positioned within said groove by the entire longitudinal extension of the groove.

* * * * *